(12) United States Patent
Zheng et al.

(10) Patent No.: US 7,830,990 B2
(45) Date of Patent: Nov. 9, 2010

(54) METHOD FOR ESTIMATING AND COMPENSATING FREQUENCY OFFSET AND FREQUENCY OFFSET ESTIMATION MODULE

(75) Inventors: Yan-Xiu Zheng, Taipei County (TW); Shih-Hsien Yang, Taichung County (TW); Yu-Ted Su, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 661 days.

(21) Appl. No.: 11/781,970

(22) Filed: Jul. 24, 2007

(65) Prior Publication Data

US 2008/0240310 A1    Oct. 2, 2008

(30) Foreign Application Priority Data

Apr. 2, 2007    (TW) .................. 96111607 A

(51) Int. Cl.
H04L 27/06    (2006.01)
(52) U.S. Cl. .................................................. 375/344
(58) Field of Classification Search .................. 375/344
See application file for complete search history.

(56) References Cited

U.S. PATENT DOCUMENTS

| | | | | |
|---|---|---|---|---|
| 5,760,984 A * | 6/1998 | Spurbeck et al. | .............. | 360/51 |
| 5,835,295 A * | 11/1998 | Behrens | ...................... | 360/51 |
| 5,867,478 A | 2/1999 | Baum et al. | | |
| 5,892,632 A * | 4/1999 | Behrens et al. | .............. | 360/51 |
| 6,111,710 A * | 8/2000 | Feyh et al. | ..................... | 360/46 |
| 6,134,286 A * | 10/2000 | Chennakeshu et al. | ...... | 375/365 |
| 6,363,084 B1 | 3/2002 | Dejonghe | | |
| 6,714,603 B2 * | 3/2004 | Ashley et al. | .............. | 375/326 |
| 6,993,084 B1 | 1/2006 | Eberlein et al. | | |
| 6,996,195 B2 | 2/2006 | Kadous | | |
| 7,050,419 B2 * | 5/2006 | Azenkot et al. | ............. | 370/347 |
| 7,088,672 B2 | 8/2006 | Kim | | |
| 7,564,931 B2 * | 7/2009 | Venkataramani et al. | .... | 375/341 |
| 2003/0137765 A1 * | 7/2003 | Yamazaki et al. | ............ | 360/39 |
| 2004/0101068 A1 * | 5/2004 | Wang et al. | ................. | 375/324 |
| 2005/0213679 A1 | 9/2005 | Yamagata | | |
| 2006/0018414 A1 | 1/2006 | Arkhipenkov et al. | | |
| 2006/0200034 A1 | 9/2006 | Ricci et al. | | |
| 2006/0200035 A1 | 9/2006 | Ricci et al. | | |
| 2008/0181097 A1 * | 7/2008 | Goldberg et al. | ........... | 370/210 |

(Continued)

FOREIGN PATENT DOCUMENTS

CN    1665230    9/2005

OTHER PUBLICATIONS

Xiao, "On the design of sinc interpolator for pilot symbol assisted modulation systems," IEEE Trans. Wireless Communications, vol. 5, pp. 2578-2585, Sep. 2006.*

(Continued)

*Primary Examiner*—Juan A Torres
(74) *Attorney, Agent, or Firm*—Jianq Chyun IP Office

(57) ABSTRACT

A method for estimating frequency offset is provided. First, a baseband signal with a preamble featuring quasi-periodic property is received. Next, the quasi-periodic property of the preamble of the received baseband signal is reconstructed by interpolation. Next, a frequency offset angle is estimated by using the reconstructed baseband signal. The accuracy of estimating frequency offset is increased because of better reconstructed quasi-periodic property of the preamble.

17 Claims, 18 Drawing Sheets

U.S. PATENT DOCUMENTS

2009/0135892 A1* 5/2009 Kwak .......................... 375/227

OTHER PUBLICATIONS

Li, "Pilot-symbol-aided channel estimation for OFDM in wireless systems", IEEE Trans. Vehicular Technology, pp. 1207-1215, Jul. 2000.*

Kim, "New Rayleigh fading channel estimator based on PSAM channel sounding technique," in Proc. IEEE ICC'97, 1997, vol. 3, pp. 1518-1520.*

Ai Ling Chua, "Improved channel estimation for OFDM based systems with transmitter diversity," Conference Record of the Thirty-Seventh Asilomar Conference on Signals, Systems and Computers, 2003 vol. 1 Publication Year: 2003, pp. 1142-1146 vol. 1.*

"1st Office Action of China Counterpart Application", issued on May 27, 2010, p. 1-p. 5.

* cited by examiner

METHOD FOR ESTIMATING AND COMPENSATING FREQUENCY OFFSET AND FREQUENCY OFFSET ESTIMATION MODULE

CROSS-REFERENCE TO RELATED APPLICATION

This application claims the priority benefit of Taiwan application serial no. 96111607, filed Apr. 2, 2007. All disclosure of the Taiwan application is incorporated herein by reference.

BACKGROUND OF THE INVENTION

1. Field of the Invention

The present invention relates to a method for estimating frequency offset of a wireless communication system, and relates to a method for estimating and compensating frequency offset.

2. Description of Related Art

Along with the steady progress in communication technology, carrying more data bits in a limited bandwidth is an inevitable trend. In order to more effectively utilize spectrum, a communication technique using multi-carriers has been developed, e.g. orthogonal frequency division multiplexing (OFDM). An OFDM system occupying a limited bandwidth composes of a plurality of sub-carriers, wherein a plurality of sub-carriers are used for parallel signal transmissions, orthogonality is sustained between the sub-carriers and each sub-carrier carries a different amount of data bits by using various modulation schemes.

An OFDM system is predominant in high transmission rate and robustness against multi-paths' effects. Undoubtedly, OFDM is one of important techniques in wireless transmission field. So called worldwide interoperability for microwave access (WiMAX) set forth not long ago is just based on the OFDM architecture following along the IEEE (Institute of Electrical and Electronics Engineers (IEEE)) standards 802.16 and 802.16a-802.16e. In addition, a new system architecture of orthogonal frequency division multiple access (OFDMA) capable of supporting multiple subscribers has been evolved from the OFDM technique by the IEEE standards 802.16d and 802.16e.

Recently, OFDM and OFDMA are broadly used in communication field. In an OFDM system, a transmission terminal groups all sub-carriers into multiple segments and performs an inverse fast Fourier transform (IFFT) to convert symbols on these segments from frequency domain into time domain as transmitted signals, and thereafter, a reception terminal performs a fast Fourier transform (FFT) to convert the transmitted signals from time domain back into frequency domain as received symbols. Accordingly, signal synchronization becomes the crucial task for an OFDM system. In other words, the IFFT/FFT operations are largely affected without the signal synchronization, which even breaks the orthogonality between sub-carriers and hereby causes inter carrier interference (ICI). Moreover, frequency offsets of the oscillators at the transmission terminal and the reception terminal thereof and the Doppler shift effect produced by reception terminal movement also break the orthogonality between the sub-carriers and increase interference. Therefore, to effectively operate an OFDM system, the reception terminal thereof needs to estimate and compensate the carrier frequency offset (CFO).

FIG. 1A is a diagram of a conventional preamble structure on time domain for an orthogonal frequency division multiple access (OFDMA) and FIG. 1B is a waveform diagram in accordance with the conventional preamble of FIG. 1A. Referring to FIGS. 1A and 1B, in a downlink system, a preamble 10 contains three quasi-periods 101, 103 and 105 according to IEEE 802.16e, wherein the preamble 10 is served for frequency synchronization.

It should be noted that the size of a discrete Fourier transform (DFT) is a power of 2, which is unable to be divided by an odd number exactly. Thus, the quasi-periods 101, 103 and 105 are not identical although the quasi-periods 101, 103 and 105 under the ideal condition are identical to each other, for example, the ideal waveform in FIG. 1B. Once a preamble 10 with a serious quasi-periodic property distortion is used to estimate frequency, a quite poor estimation is expected.

In order to improve the quasi-periodic structure of the preamble 10 (almost-periodic preamble), a scheme by increasing the sampling frequency is provided. FIG. 1C is a waveform diagram of, for example, a conventional preamble after increasing the sampling frequency thereof. Referring to FIGS. 1B and 1C, the real sampled signal waveform shown by FIG. 1C indicates a case where the sampling frequency is double that in FIG. 1B. It can be seen that the quasi-periods 101, 103 and 105 in FIG. 1C still contain serious mismatches although the sampling frequency of the preamble 10 is doubled. When the sampling frequency approaches infinity, the quasi-periodic property of the preamble 10 can be theoretically improved but the cost of the hardware is high, which is impractical. Therefore, the manufactures are looking for an alternative solution to reconstruct a better quasi-periodic property of the preamble 10, which is not only cost effective but also increases the accuracy of estimating a carrier frequency offset for an accurate compensation.

SUMMARY OF THE INVENTION

An exemplary embodiment consistent with the present invention is a method for estimating frequency offset which utilizes interpolation to reconstruct the quasi-periodic property of a preamble and estimates frequency offset angle by using the preamble so as to increase the accuracy of estimating frequency offset angle.

Another exemplary embodiment consistent with the present invention is a frequency offset estimation module, which reconstructs the quasi-periodic property of preamble by interpolation prior to estimating a frequency offset and calculates a frequency offset angle based on the reconstructed baseband signal so as to increase the accuracy of estimating frequency offset angle.

As embodied and broadly described herein, an exemplary example consistent with the present invention provides a method for estimating frequency offset for a wireless communication system with a quasi-periodic pilot structure. The method for estimating frequency offset includes: receiving a baseband signal with a preamble having quasi-periodic property, performing an interpolation operation to reconstruct a better quasi-periodic property of the baseband signal preamble and performing a frequency offset calculation on the reconstructed baseband signal to obtain a frequency offset angle.

As embodied and broadly described herein, an exemplary example consistent with the present invention provides a frequency offset estimation module for a wireless communication system with a quasi-periodic pilot structure. The frequency offset estimation module includes an interpolation unit and a frequency offset calculator. The interpolation unit receives a baseband signal with a preamble having quasi-periodic property and performs an interpolation operation to reconstruct a better quasi-periodic property of the baseband signal preamble. The frequency offset calculator is coupled to the interpolation unit and calculates a frequency offset angle according to the reconstructed baseband signal.

In order to make the aforementioned and other objectives, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
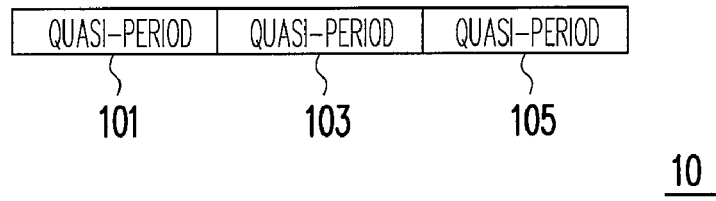
FIG. 1A is a diagram of a conventional preamble structure on time domain for an orthogonal frequency division multiple access (OFDMA).
Figure 1B:
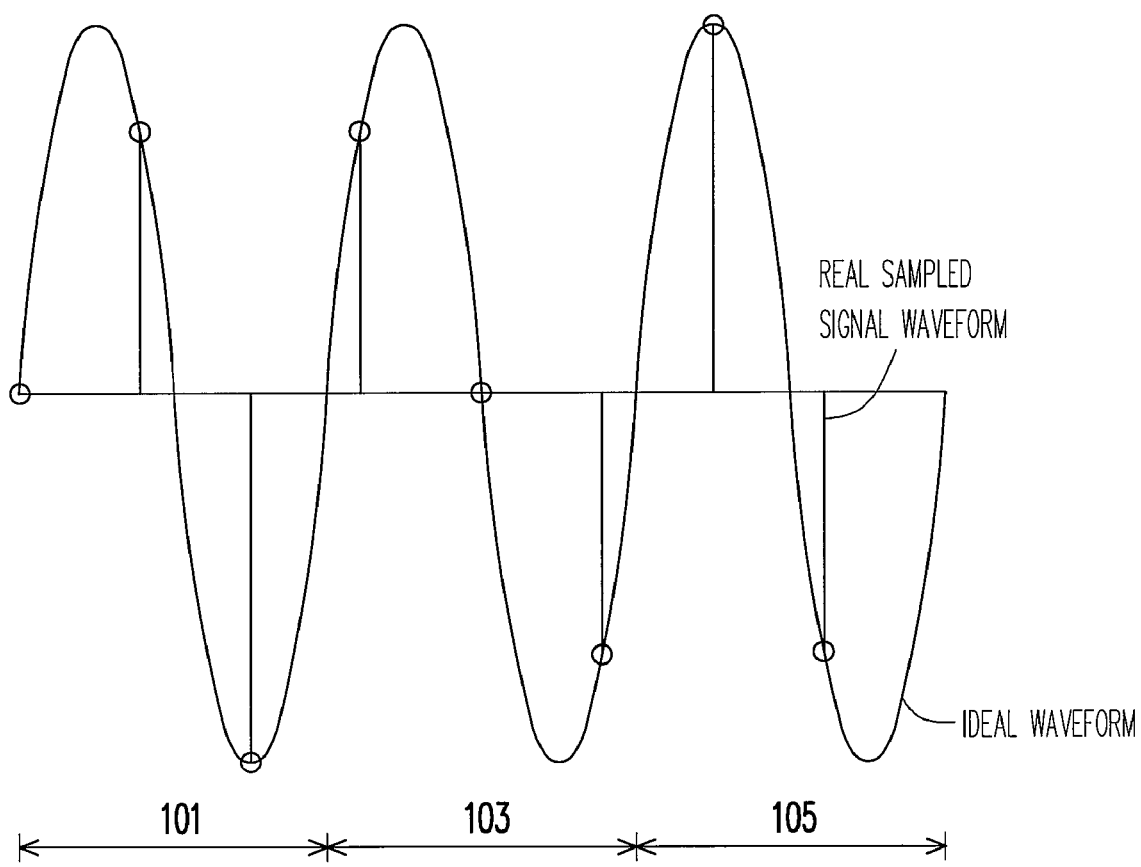
FIG. 1B is a waveform diagram in accordance with the conventional preamble of FIG. 1A.
Figure 1C:
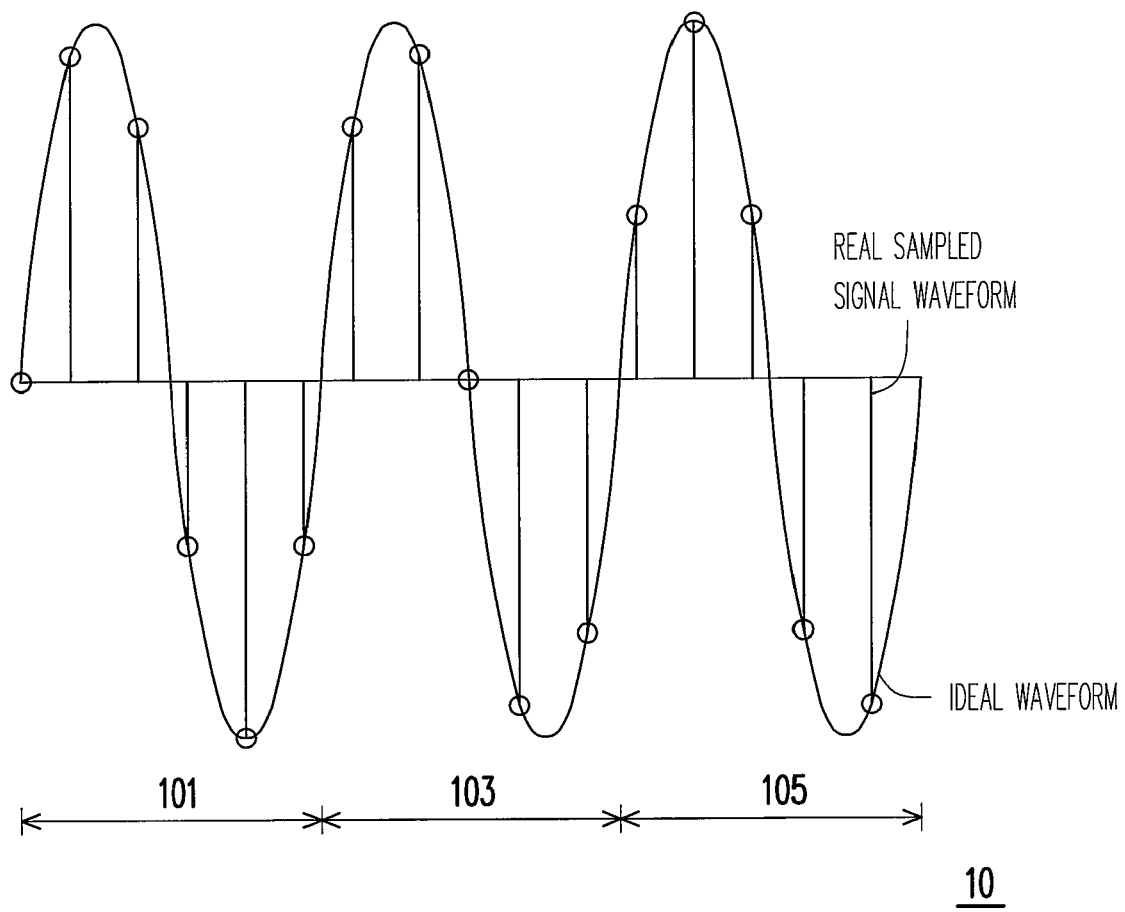
FIG. 1C is a waveform diagram of a conventional preamble after increasing the sampling frequency thereof.
Figure 2A:
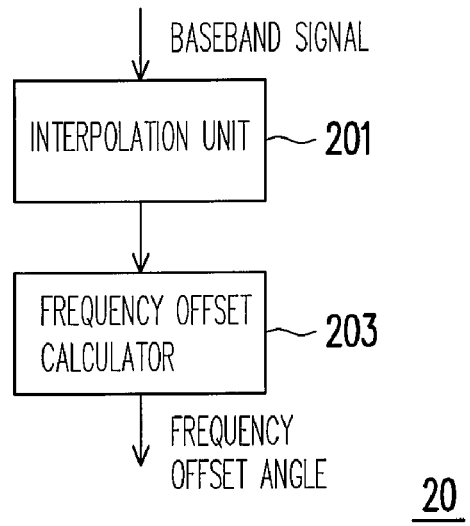
FIG. 2A is an architecture block diagram of a frequency offset estimation module according to a first exemplary embodiment of the present invention.
Figure 2B:
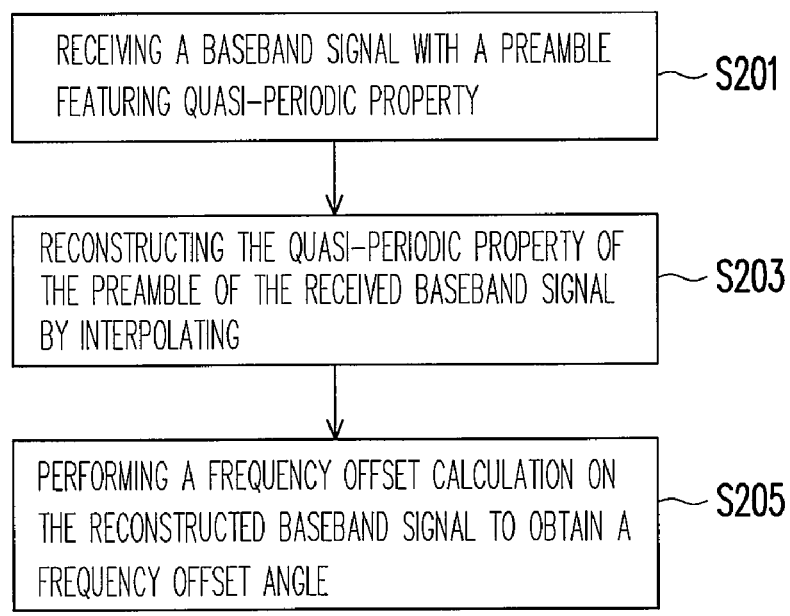
FIG. 2B is a flowchart of a method for estimating frequency offset according to the first exemplary embodiment of the present invention.

FIG. 2A is an architecture block diagram of a frequency offset estimation module according to a first exemplary embodiment of the present invention and FIG. 2B is a flowchart of a method for estimating frequency offset according to the first exemplary embodiment of the present invention. Referring to FIGS. 2A and 2B, a frequency offset estimation module 20 includes an interpolation unit 201 and a frequency offset calculator 203. In step S201, as shown by FIG. 2B, the interpolation unit 201 receives a baseband signal with a preamble having quasi-periodic property. In step S203, the interpolation unit 201 reconstructs a better quasi-periodic property of the preamble by interpolating. The interpolation unit 201 can be, for example, a linear interpolation unit or, in another exemplary embodiment, the interpolation unit 201 can be a sinc function interpolation unit. In step S205, the frequency offset calculator 203 coupled to the interpolation unit 201 calculates a frequency offset angle according to the reconstructed baseband signal. In this way, the quasi-periodic property of preamble is reconstructed and the accuracy of estimating frequency offset is increased. Anyone skilled in the art can certainly further improve the angle offset thereof according to the obtained frequency offset angle. The procedure to reconstruct the quasi-periodic property of preamble would be depicted in more detail hereinafter.

Figure 3A:
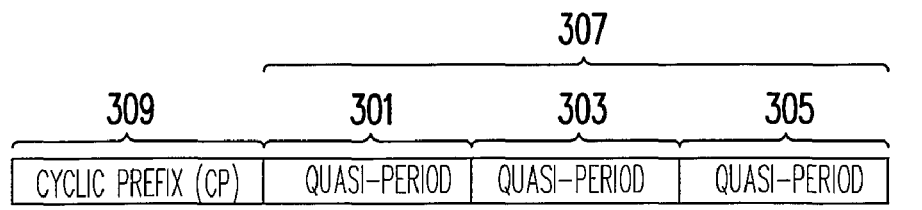
FIG. 3A is a diagram of a preamble structure according to a first exemplary embodiment of the present invention.

FIG. 3A is a diagram of a preamble structure according to the first exemplary embodiment of the present invention. Referring to FIG. 3A, a preamble 30 includes three quasi-periods 301, 303 and 305. The quasi-periods 301, 303 and 305 are together termed as a symbol 307 as well. Note that a cyclic prefix (CP) 309 added in front of the symbol 307 is intended to sustain the orthogonality of carrier waveform and is a replica of a part of the symbol 307. In other words, the CP 309 serves as a guard interval.

The quasi-periods 301, 303 and 305 are segments respectively formed by a plurality of sampling points. Taking a size of 128 sampling points as an example, the quasi-periods 301, 303 and 305 in the present embodiment are respectively composed of the sampling point 0 to the sampling point 42, the sampling point 43 to the sampling point 85 and the sampling point 86 to the sampling point 127. In other exemplary embodiments, the quasi-periods 301, 303 and 305 can be implemented in other sizes. Anyone skilled in the art can take other sampling point numbers to implement the segments with quasi-periodic property to meet the requirement thereof.

Figure 3B:
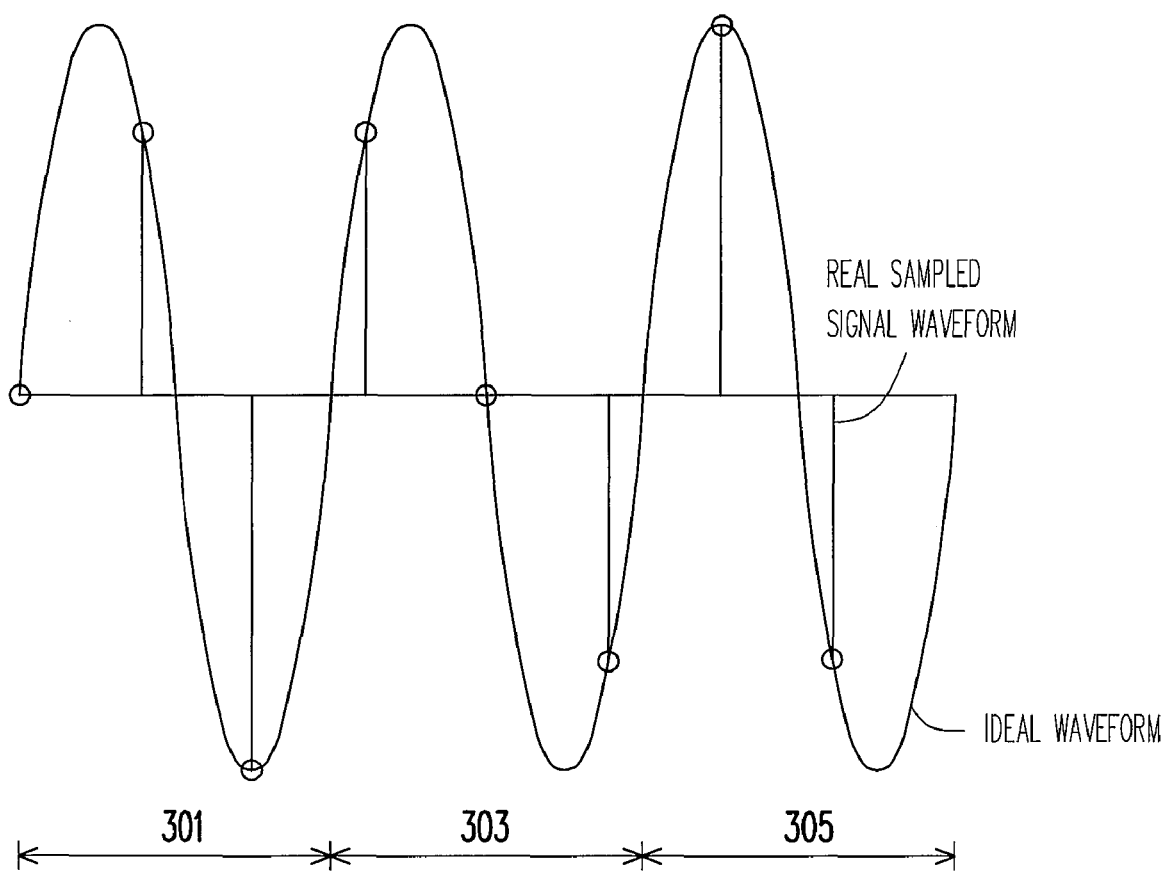
FIG. 3B is a waveform diagram of a preamble according to the first exemplary embodiment of the present invention.

FIG. 3B is a waveform diagram of a preamble according to the first exemplary embodiment of the present invention. It can be seen as an ideal waveform, the quasi-periods 301, 303 and 305 should be periodic and display the identical waveform. However, after sampling, the quasi-periods 301, 303 and 305 can not keep the original quasi-periodic property and waveform, where a real sampled signal waveform is shown in FIG. 3B. The quasi-periodic property of the preamble 30 must be restored by interpolating. Anyone skilled in the art can use different interpolation approaches to restore the quasi-periodic property of the preamble 30 to meet the requirement thereof.

Figure 3C:
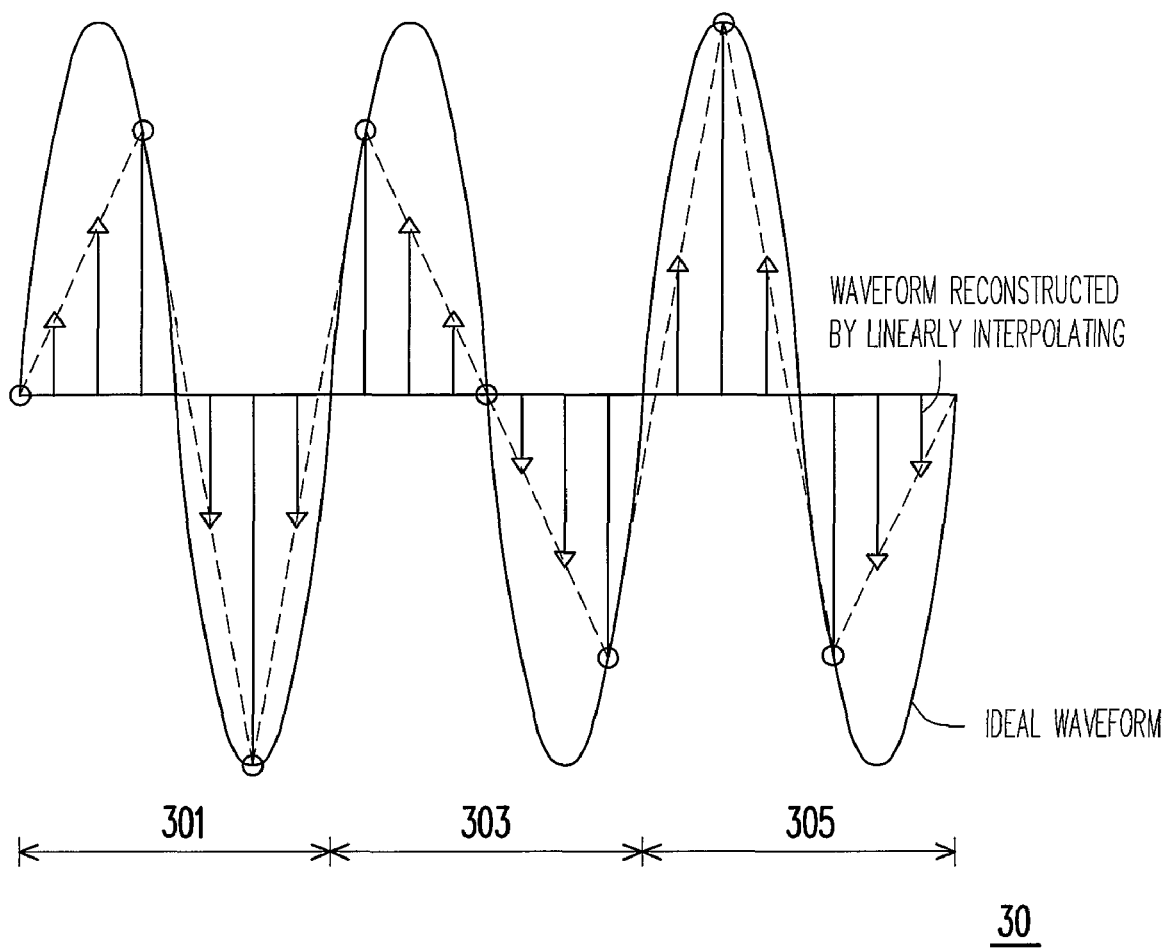
FIG. 3C is a waveform diagram of a preamble reconstructed by linearly interpolating according to the first exemplary embodiment of the present invention.

FIG. 3C is a waveform diagram of a preamble reconstructed by, for example, linearly interpolating according to the first exemplary embodiment of the present invention. Referring to FIG. 3C, two interpolation points are added between every two adjacent sampling points by linearly interpolating in the embodiment. In another exemplary embodiment, the number of the interpolation points is other than two, and the more the interpolation points, the better the resulted quasi-periodic property of the preamble 30 is. Comparing the reconstructed waveform by interpolating in FIG. 3C with the real sampled signal waveform in FIG. 3B, the quasi-periodic property and the waveforms of the quasi-periods 301, 303 and 305 are improved significantly.

Figure 3D:
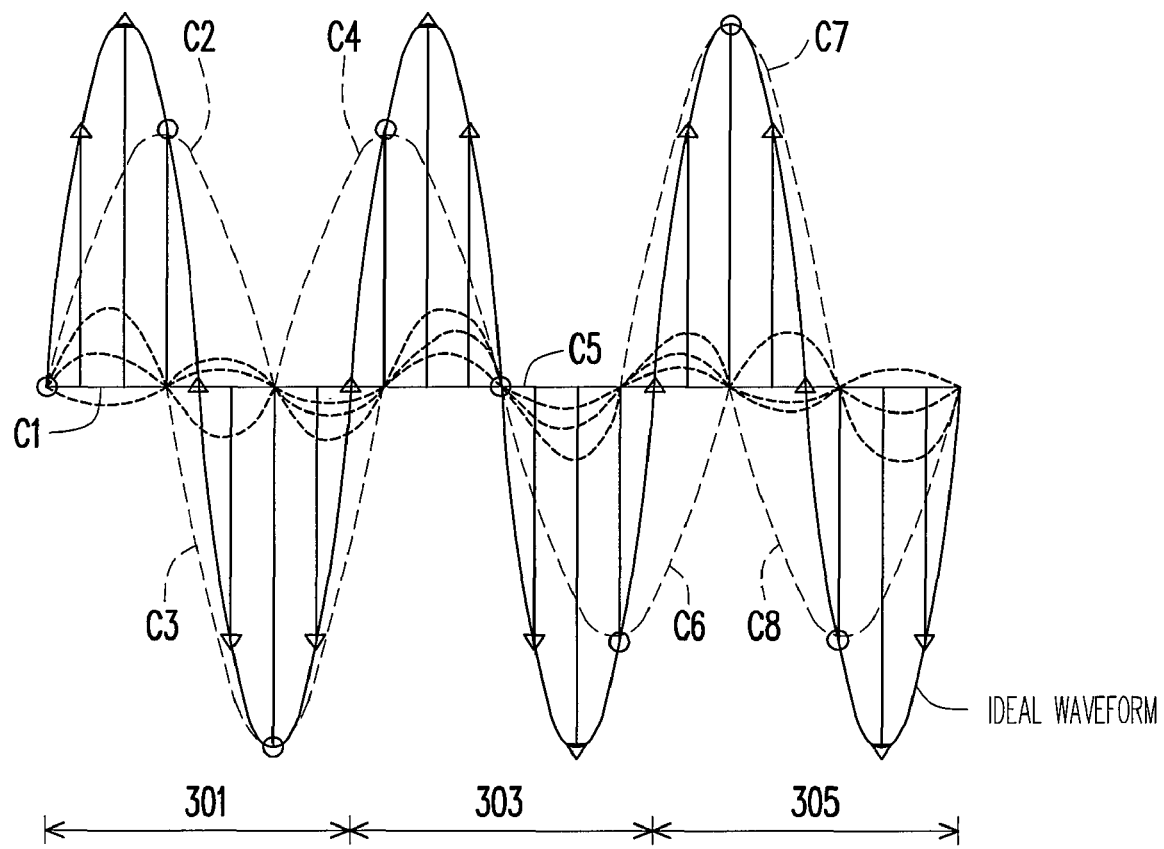
FIG. 3D is a waveform diagram of a preamble reconstructed by sinc function interpolating according to the first exemplary embodiment of the present invention.

FIG. 3D is a waveform diagram of a preamble reconstructed by sinc function interpolating according to the first exemplary embodiment of the present invention. Referring to FIG. 3D representing another exemplary embodiment, two interpolation points are added between every two adjacent sampling points by sinc function interpolating to restore the quasi-periodic property and waveform of the preamble 30, where corresponding to each sampling point a sine function waveform is generated. For example, a sinc function waveform represented by a curve C1 corresponds to the first sampling point, and similarly, curves C2-C8 are sinc function waveforms correspond to other sampling points. Thus, a resulted waveform obtained by summing the sinc function waveforms of all the sampling points is approximated to the original ideal waveform. It can be seen that the quasi-periodic property and the original waveform of the preamble 30 can be restored by summing the sinc function waveforms of all the sampling points and thereby estimate the expected values of the interpolation points.

Anyone skilled in the art can alter the implementation of sinc function interpolating according to the concept of the present invention and the disclosed exemplary embodiments to meet the requirement thereof. For example, to estimate the expected value of an interpolation point, only the sinc function waveforms of several sampling points near to the interpolation point, not all sampling points, are used for summing. In this way, the operation complexity required by restoring quasi-periodic property and waveform of the preamble 30 can be reduced. In the following, the procedure to estimate a frequency offset by using the frequency offset calculator 203 is depicted in more detail.

Figure 4:
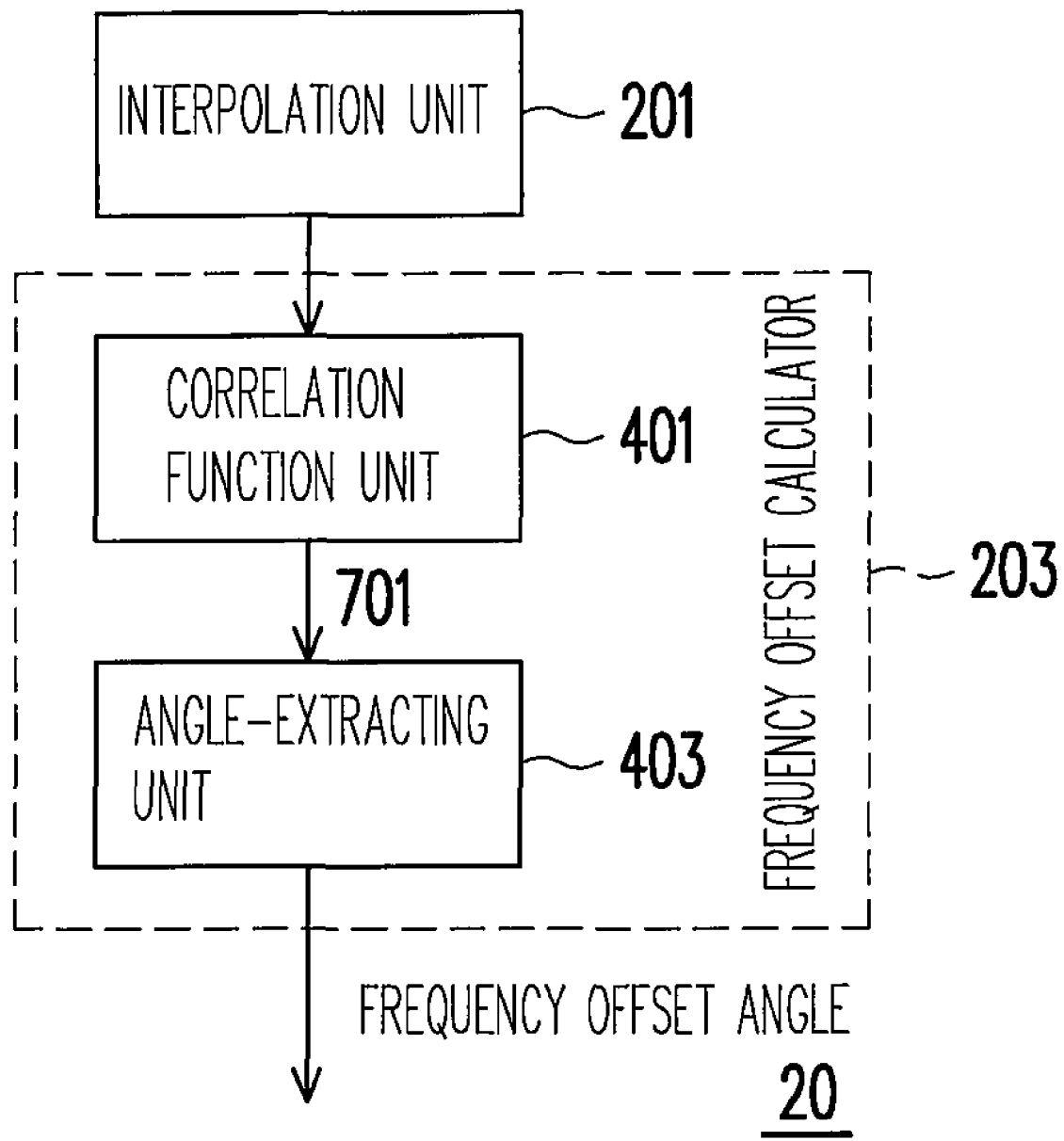
FIG. 4 is an architecture block diagram of a frequency offset calculator according to the first exemplary embodiment of the present invention.

Those skilled in the art would understand that the method for estimating frequency offset used by each manufacturer is different from one another; thus, only several common methods for estimating frequency offset are exemplarily expressed herein. FIG. 4 is an architecture block diagram of a frequency offset calculator according to the first exemplary embodiment of the present invention. Referring to FIG. 4, the frequency offset calculator 203 includes a correlation function unit 401 and an angle-extracting unit 403. The correlation function unit 401 is coupled to the interpolation unit 201 and generates a correlation function 701 according to a baseband signal. The angle-extracting unit 403 is coupled to the correlation function unit 401 and extracts a frequency offset angle according to the correlation function 701. The operation of the correlation function unit 401 is described in more detail hereinafter.

Figure 5A:
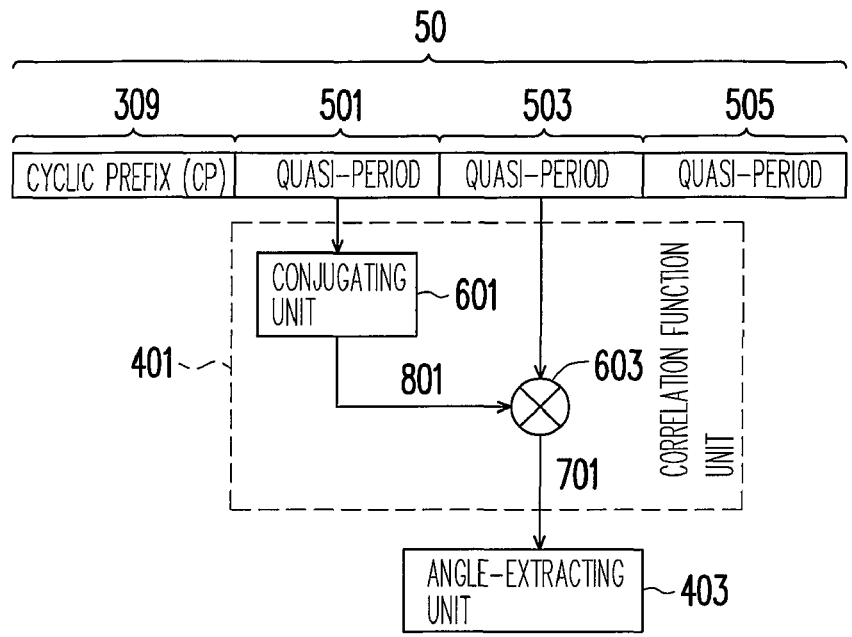
FIG. 5A is an operation diagram of a correlation unit according to the first exemplary embodiment of the present invention.
Figure 5B:
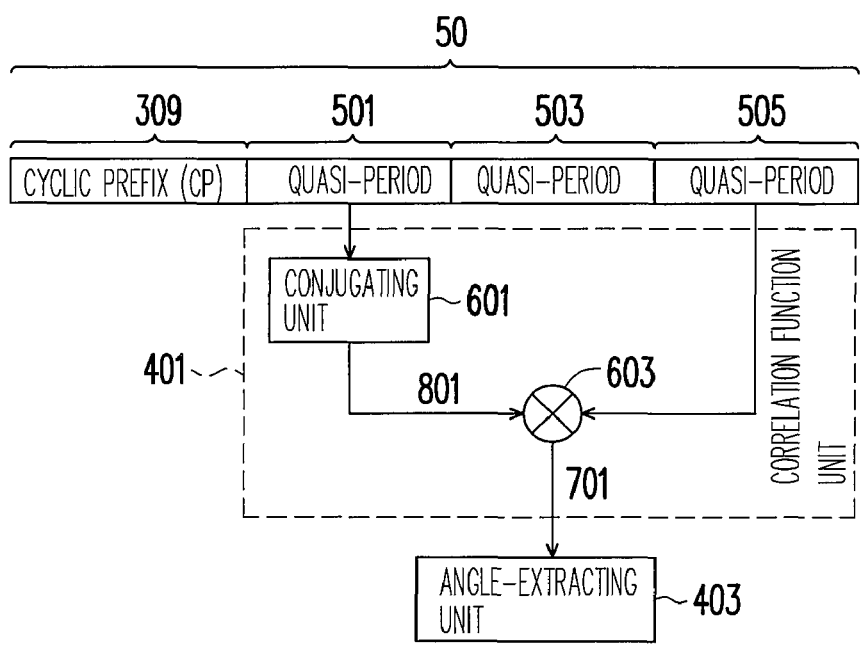
FIGS. 5B-5F are operation diagrams of other correlation units according to the first exemplary embodiment of the present invention.
Figure 5C:
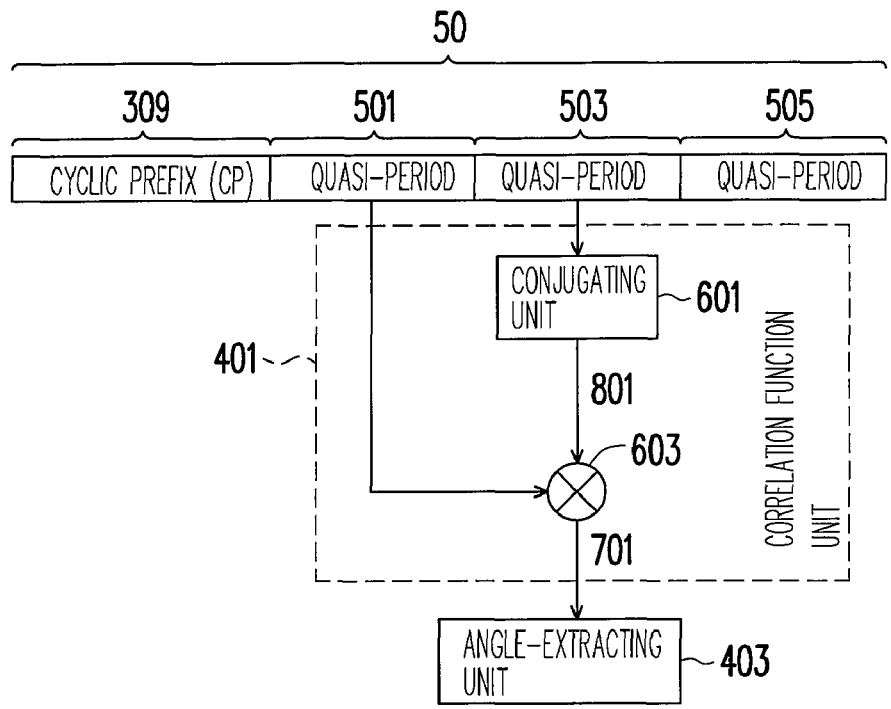
Figure 5D:
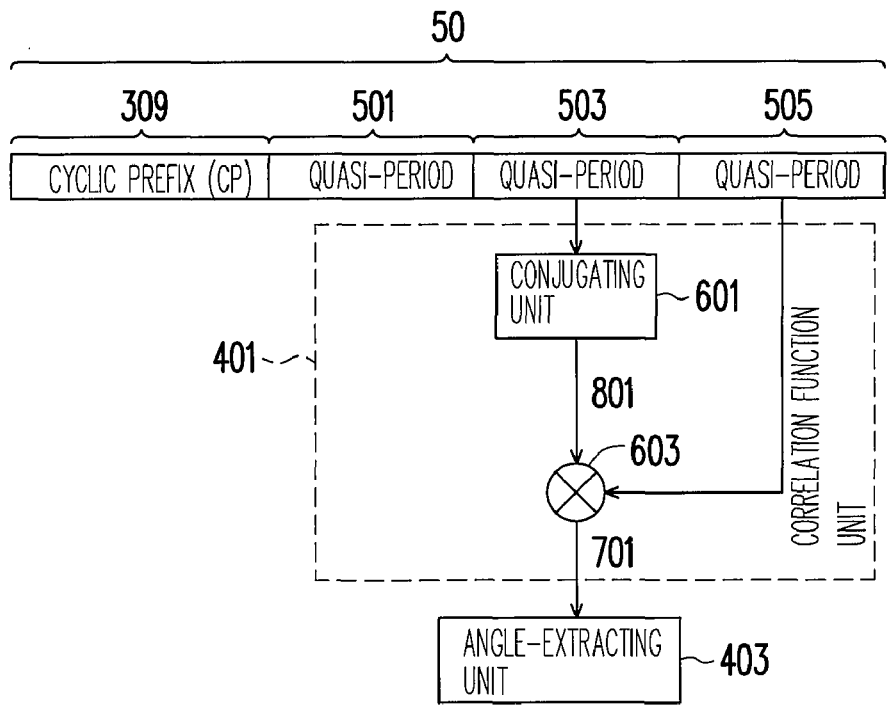
Figure 5E:
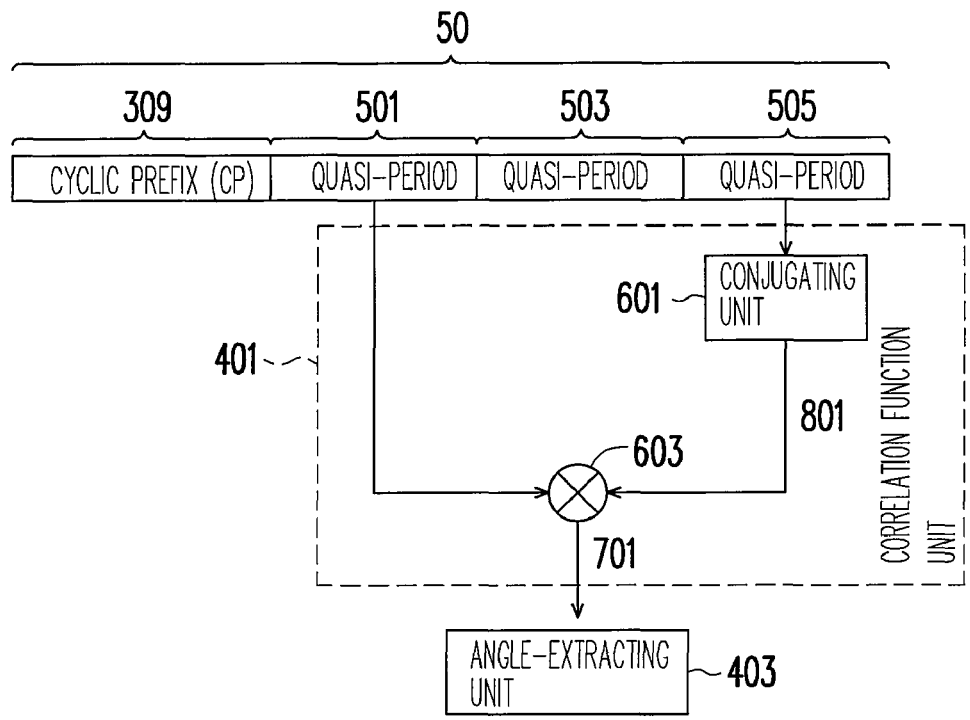
Figure 5F:
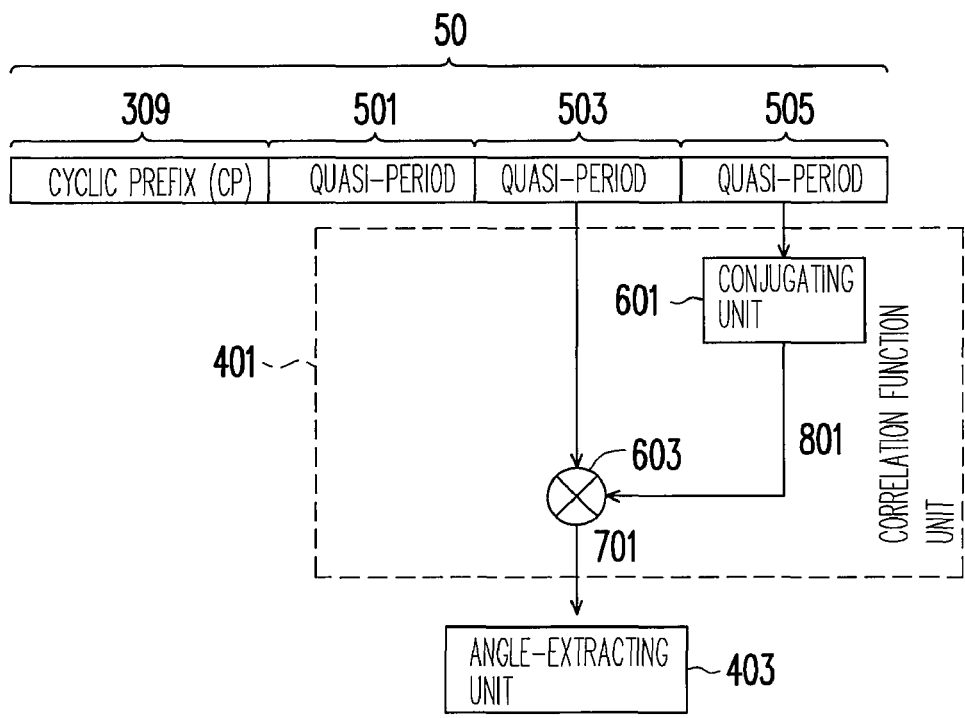

FIG. 5A is an operation diagram of a correlation unit according to the first exemplary embodiment of the present invention. Referring to FIG. 5A, a preamble 50 in the embodiment includes three quasi-periods 501, 503 and 505, and the quasi-periodic property of the quasi-periods 501, 503 and 505 has been reconstructed by interpolating, as explained in the above-described embodiment, already. In other words, the real sampled signal waveforms of the quasi-periods 501, 503 and 505 are very similar to each other.

The correlation function unit 401 includes a conjugating unit 601 and a multiplier 603. The conjugating unit 601 is coupled to an interpolation unit (not shown) and performs a conjugating processing on the quasi-period 501 of the preamble of the baseband signal to obtain a conjugating quasi-period 801. The multiplier 603 is coupled to the interpolation unit (not shown) and the conjugating unit 601. The multiplier 603 performs a correlation operation on the quasi-period 503 and the conjugating quasi-period 801 to obtain a correlation function 701, and the angle-extracting unit 403 extracts a frequency offset angle according to the correlation function 701 so as to increase the accuracy of estimating frequency offset angle by means of the reconstructed preamble 50.

Anyone skilled in the art can change the quasi-period extracted by the conjugating unit 601 and the multiplier 603 according to the concept of the present invention and the disclosed embodiments to meet the requirement thereof. For example, FIGS. 5B-5F are operation diagrams of other correlation units according to the first exemplary embodiment of the present invention, while other implementations can be referred to FIG. 5A and are omitted herein.

Figure 6A:
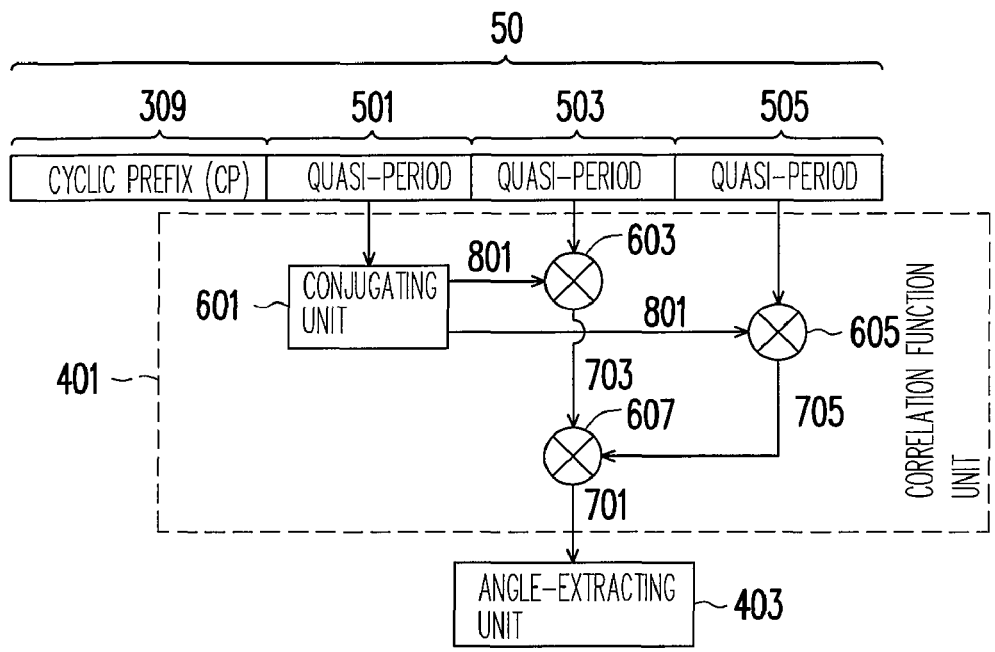
FIG. 6A is an operation diagram of a correlation unit according to a second exemplary embodiment of the present invention.

Anyone skilled in the art can alter the architecture of the correlation function unit according to the concept of the present invention and the disclosed exemplary embodiments to meet the requirement thereof. For example, FIG. 6A is an operation diagram of a correlation unit according to a second exemplary embodiment of the present invention. Referring to FIG. 6A, the preamble 50 herein can be referred to the above-mentioned embodiment and is omitted herein. The correlation function unit 401 in the embodiment includes a conjugating unit 601 and multipliers 603, 605 and 607. The conjugating unit 601 is coupled to an interpolation unit (not shown) and performs a conjugating processing on the quasi-period 501 of the preamble of the baseband signal to obtain a conjugating quasi-period 801.

The multiplier 603 is coupled to the interpolation unit (not shown) and the conjugating unit 601. The multiplier 603 performs a correlation operation on the quasi-period 503 of the preamble of the baseband signal and the conjugating quasi-period 801 to obtain a correlation function 703. The multiplier 605 is coupled to the interpolation unit (not shown) and the conjugating unit 601. The multiplier 605 performs a correlation operation on the quasi-period 505 of the preamble of the baseband signal and the conjugating quasi-period 801 to obtain a correlation function 705. The multiplier 607 is coupled to the multipliers 603 and 605. The multiplier 607 performs a correlation operation to obtain the correlation function 701 according to the correlation functions 703 and 705. The angle-extracting unit 403 extracts a frequency offset angle according to the correlation function 701 so as to increase the accuracy of estimating frequency offset angle by means of the reconstructed preamble 50.

Figure 6B:
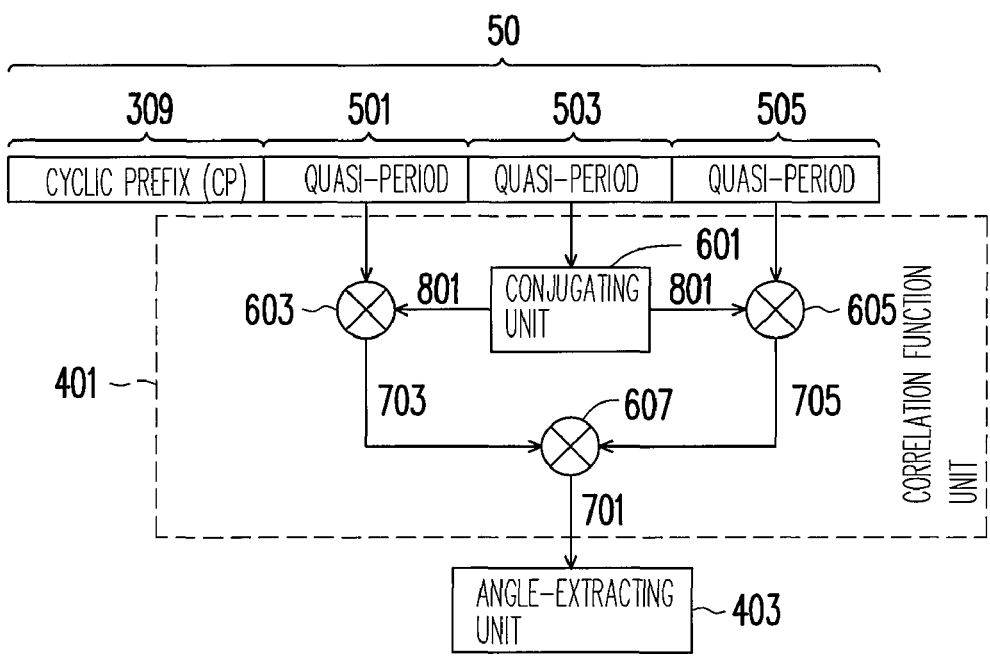
FIGS. 6B and 6C are operation diagrams of other correlation units according to the second exemplary embodiment of the present invention.
Figure 6C:
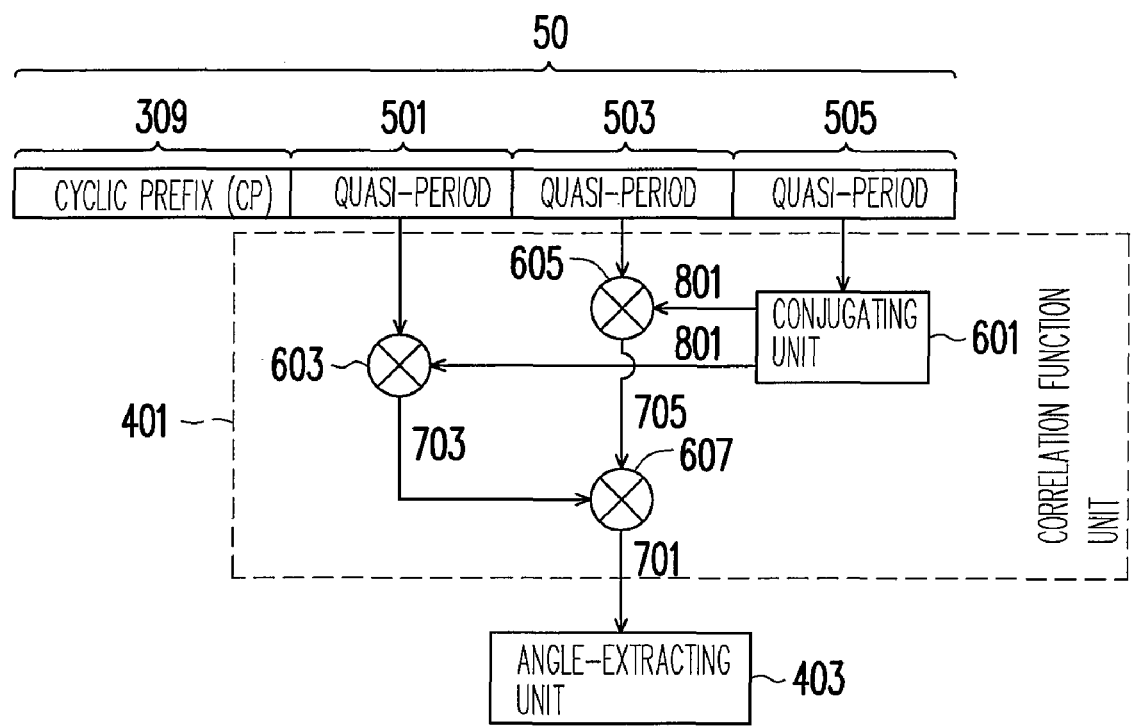

Anyone skilled in the art can change the quasi-periods extracted by the conjugating unit 601 and the multipliers 603 and 605 according to the concept of the present invention and the disclosed embodiments to meet the requirement thereof. For example, FIGS. 6B and 6C are operation diagrams of other correlation units according to the second exemplary embodiment of the present invention, while other implementations can be referred to FIG. 6A and are omitted herein.

Figure 7A:
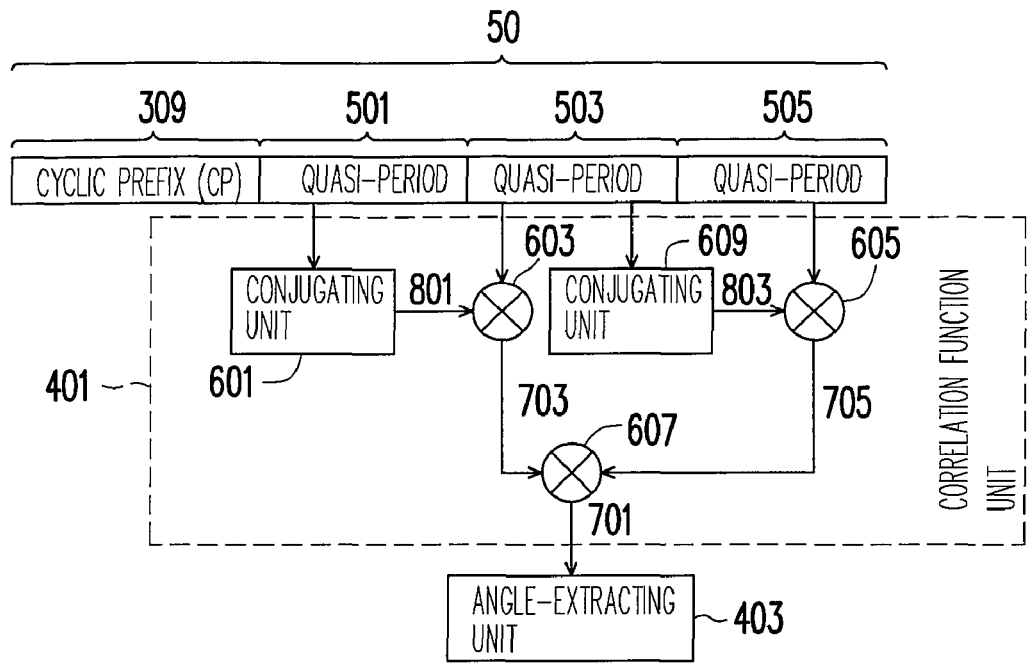
FIG. 7A is an operation diagram of a correlation unit according to a third exemplary embodiment of the present invention.
Figure 7B:
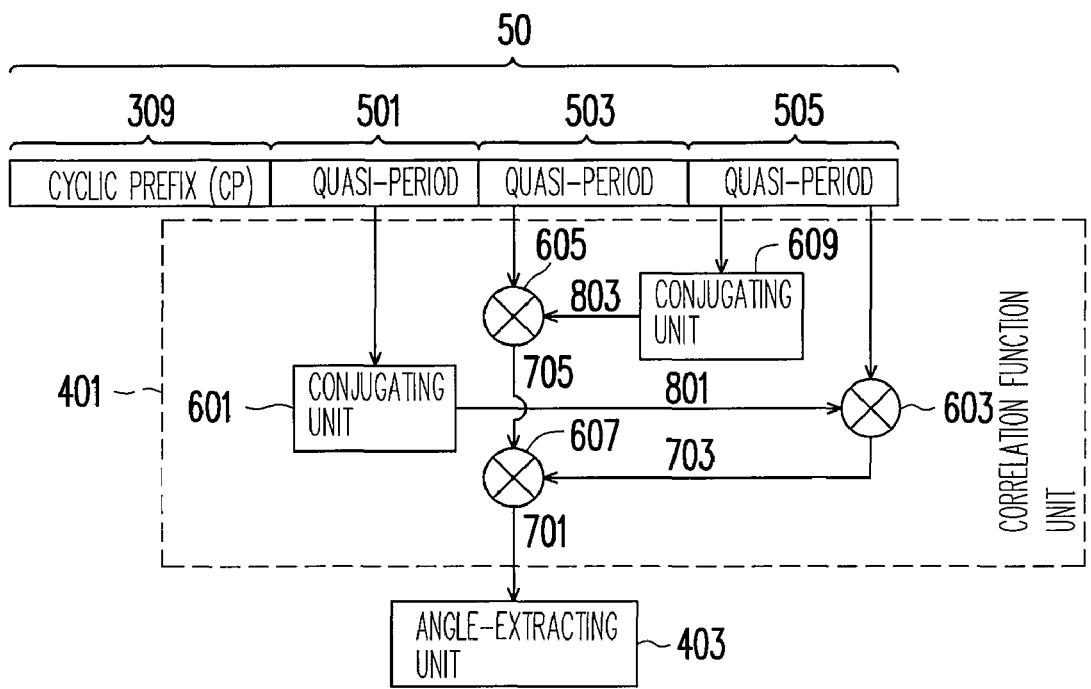
FIGS. 7B-7F are operation diagrams of other correlation units according to the third exemplary embodiment of the present invention.
Figure 7C:
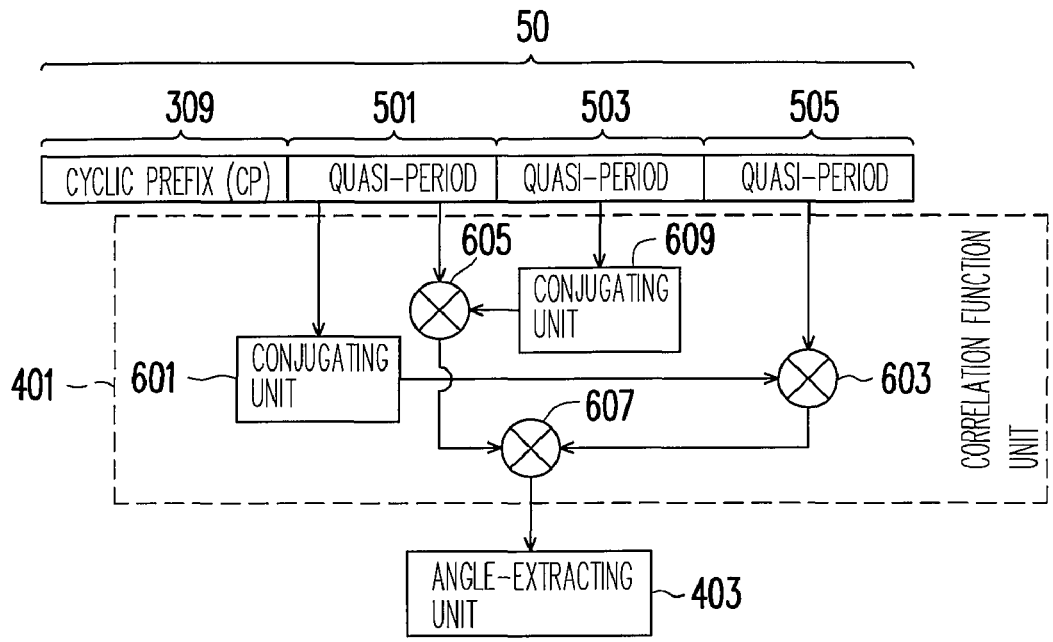
Figure 7D:
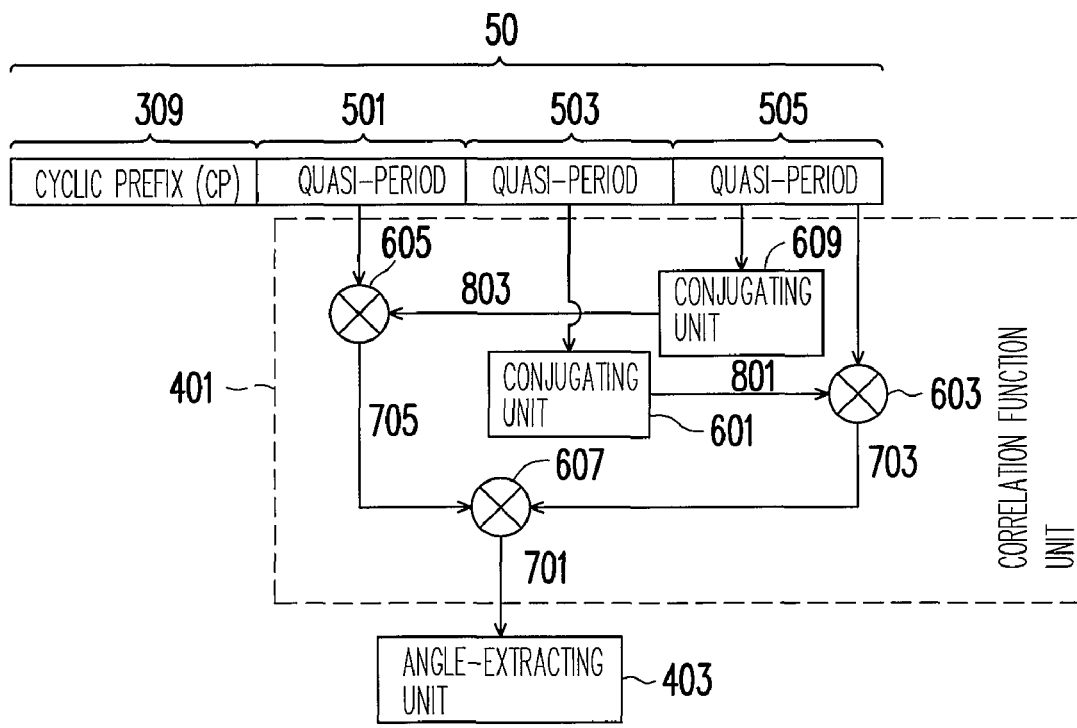
Figure 7E:
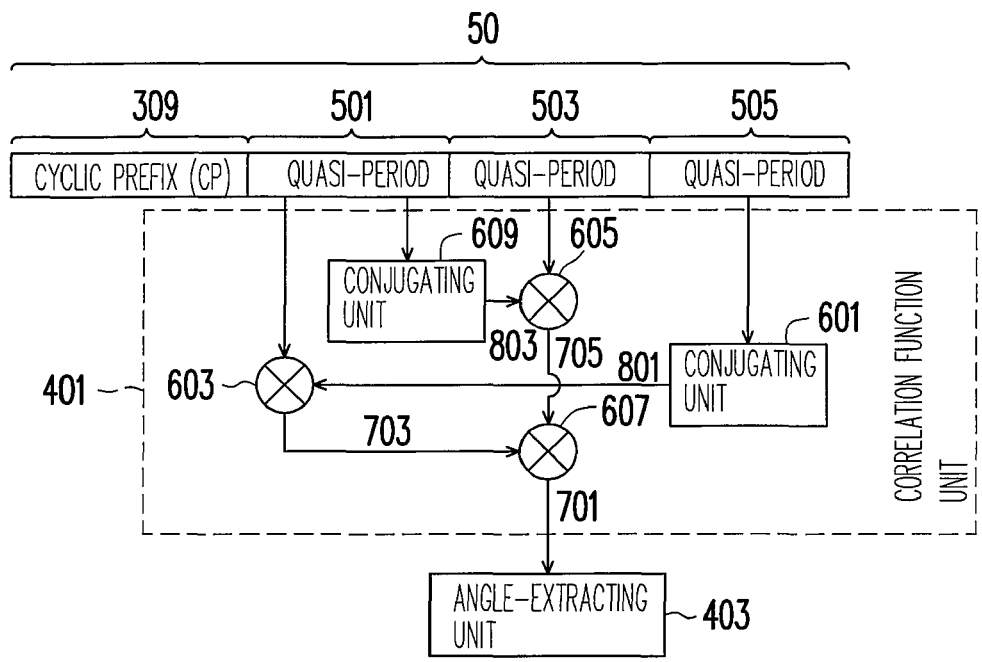
Figure 7F:
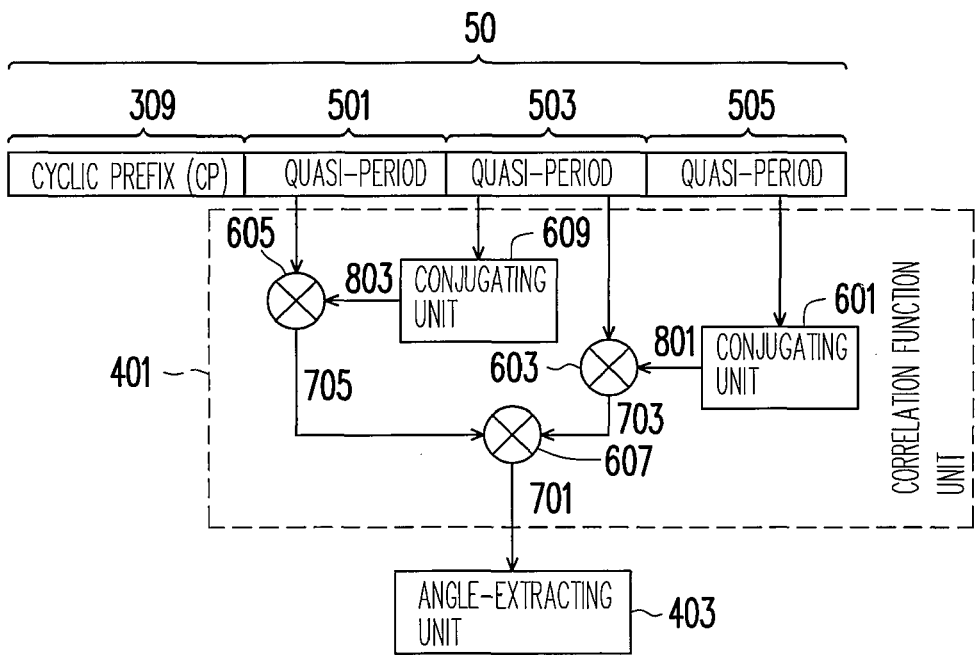

Anyone skilled in the art can alter the architecture of the correlation function unit according to the concept of the present invention and the disclosed exemplary embodiments to meet the requirement thereof. For example, FIG. 7A is an operation diagram of a correlation unit according to a third exemplary embodiment of the present invention. Referring to FIG. 7A, the preamble 50 herein can be referred to the above-mentioned embodiment and is omitted herein. The correlation function unit 401 in the embodiment includes conjugating units 601 and 609 and multipliers 603, 605 and 607. The conjugating unit 601 is coupled to an interpolation unit (not shown) and performs a conjugating processing on the quasi-period 501 of the preamble of the baseband signal to obtain a conjugating quasi-period 801. The multiplier 603 is coupled to the interpolation unit (not shown) and the conjugating unit 601. The multiplier 603 performs a correlation operation on the quasi-period 503 of the preamble of the baseband signal and the conjugating quasi-period 801 to obtain a correlation function 703. The conjugating unit 609 is coupled to the interpolation unit (not shown) and performs a conjugating processing on the quasi-period 503 of the preamble of the baseband signal to obtain a conjugating quasi-period 803. The multiplier 605 is coupled to the interpolation unit (not shown) and the conjugating unit 609. The multiplier 605 performs a correlation operation on the quasi-period 505 of the preamble of the baseband signal and the conjugating quasi-period 803 to obtain a correlation function 705. The multiplier 607 is coupled to the multipliers 603 and 605. The multiplier 607 performs a correlation operation to obtain the correlation function 701 according to the correlation functions 703 and 705. The angle-extracting unit 403 extracts a frequency offset angle according to the correlation function 701 so as to increase the accuracy of estimating frequency offset angle by means of the reconstructed preamble 50.

Anyone skilled in the art can change the quasi-periods extracted by the conjugating units 601 and 609 and the multipliers 603 and 605 according to the concept of the present invention and the disclosed exemplary embodiments to meet the requirement thereof. For example, FIGS. 7B-7F are operation diagrams of other correlation units according to the third exemplary embodiment of the present invention, while other implementations can be referred to FIG. 7A and are omitted herein.

Figure 8A:
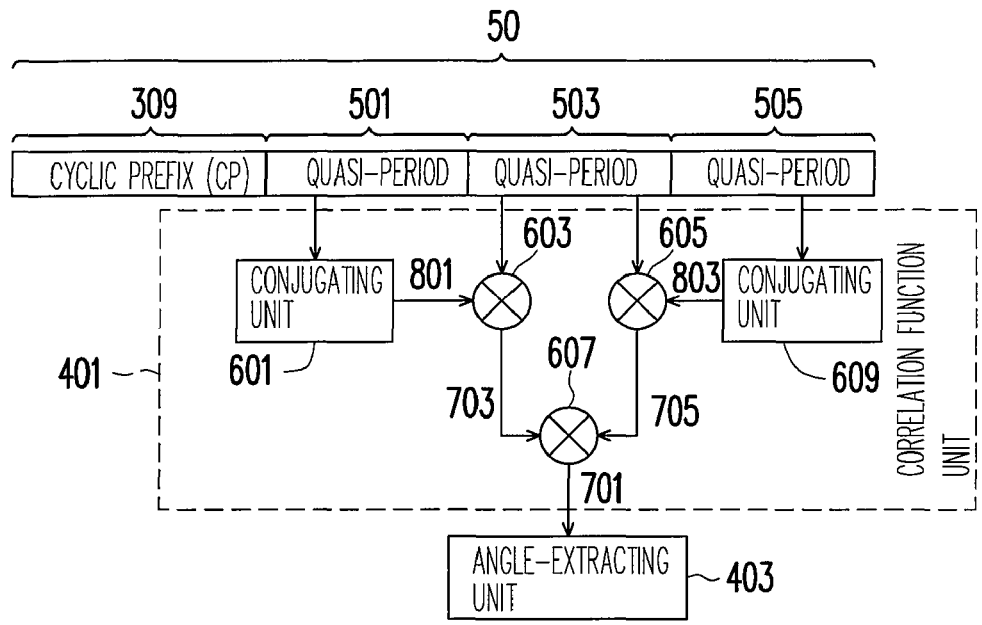
FIG. 8A is an operation diagram of a correlation unit according to a fourth exemplary embodiment of the present invention.

Anyone skilled in the art can alter the architecture of the correlation function unit according to the concept of the present invention and the disclosed exemplary embodiments to meet the requirement thereof. For example, FIG. 8A is an operation diagram of a correlation unit according to a fourth exemplary embodiment of the present invention. Referring to FIG. 8A, the preamble 50 herein can be referred to the above-mentioned exemplary embodiment and is omitted herein. The correlation function unit in the embodiment includes conjugating units 601 and 609 and multipliers 603, 605 and 607. The conjugating unit 601 is coupled to an interpolation unit (not shown) and performs a conjugating processing on the quasi-period 501 of the preamble of the baseband signal to obtain a conjugating quasi-period 801. The multiplier 603 is coupled to the interpolation unit (not shown) and the conjugating unit 601. The multiplier 603 performs a correlation operation on the quasi-period 503 of the preamble of the baseband signal and the conjugating quasi-period 801 to obtain a correlation function 703. The conjugating unit 609 is coupled to the interpolation unit (not shown) and performs a conjugating processing on the quasi-period 505 of the preamble of the baseband signal to obtain a conjugating quasi-period 803. The multiplier 605 is coupled to the interpolation unit (not shown) and the conjugating unit 609. The multiplier 605 performs a correlation operation on the quasi-period 503 of the preamble of the baseband signal and the conjugating quasi-period 803 to obtain a correlation function 705. The multiplier 607 is coupled to the multipliers 603 and 605. The multiplier 607 performs a correlation operation to obtain the correlation function 701 according to the correlation functions 703 and 705. The angle-extracting unit 403 extracts a frequency offset angle according to the correlation function 701 so as to increase the accuracy of estimating frequency offset angle by means of the reconstructed preamble 50.

Figure 8B:
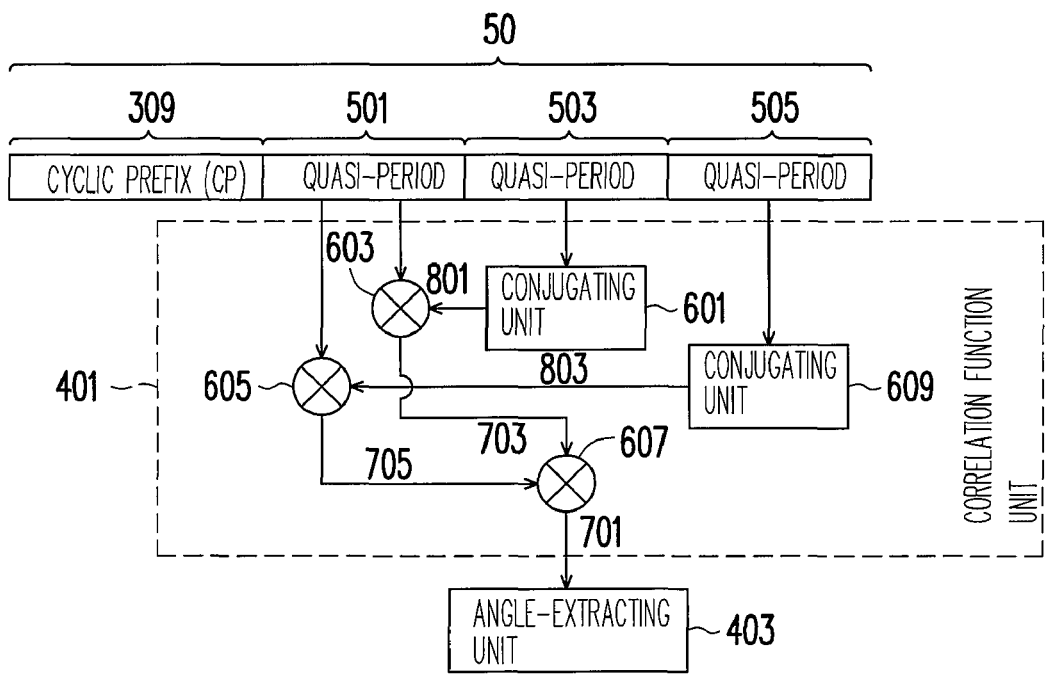
FIGS. 8B and 8C are operation diagrams of other correlation units according to the fourth exemplary embodiment of the present invention.
Figure 8C:
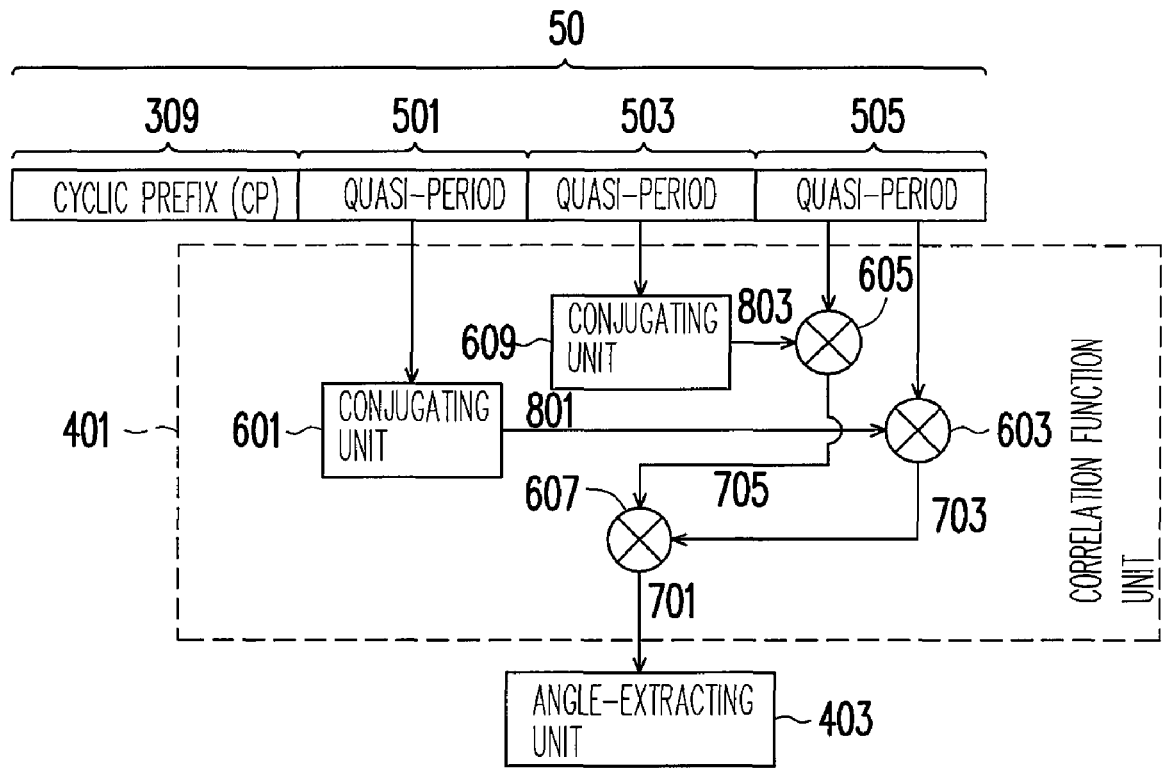

Anyone skilled in the art can change the quasi-periods extracted by the conjugating units 601 and 609 and the multipliers 603 and 605 according to the concept of the present invention and the disclosed exemplary embodiments to meet the requirement thereof. For example, FIGS. 8B and 8C are operation diagrams of other correlation units according to the fourth exemplary embodiment of the present invention, while other implementations can be referred to FIG. 8A and are omitted herein.

It should be noted that although the above-described exemplary embodiments have provided multiple feasible architectures of the correlation function unit 401, but anyone skilled in the art would understand different manufacturers have different designs of the correlation function unit 401; therefore, the applications of the present invention are not limited by the above exemplified architectures. In other words, once a frequency offset calculator 203 uses interpolating prior to a frequency offset estimation to reconstruct better quasi-periodic property of the preamble, the adopted scheme shall also be construed to be within the scope of the present invention.

Figure 9A:
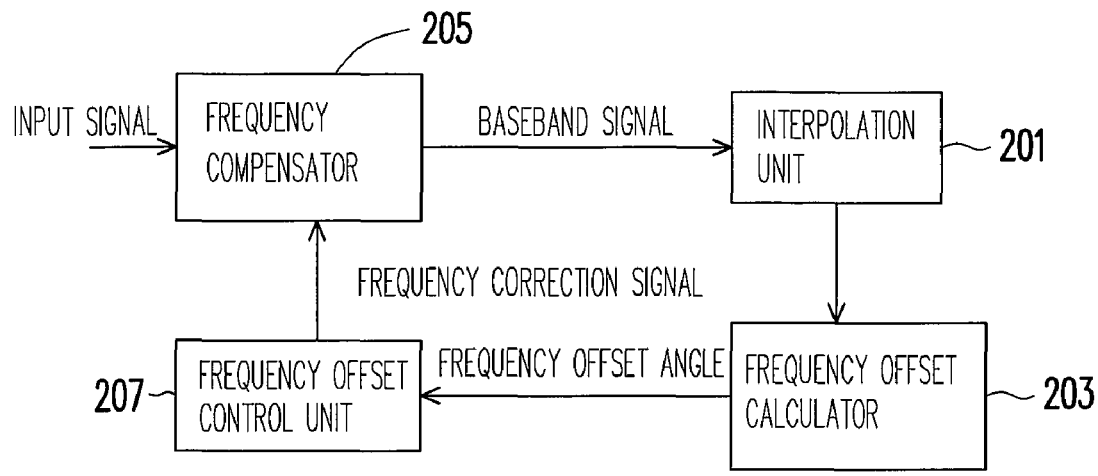
FIG. 9A is an architecture block diagram of a frequency offset estimation module according to the fifth exemplary embodiment of the present invention.

Anyone skilled in the art can alter the architecture of the frequency offset estimation module 20 according to the spirit of the present invention and the disclosed exemplary embodiments to meet the requirement thereof. For example, FIG. 9A is an architecture block diagram of a frequency offset estimation module according to the fifth exemplary embodiment of the present invention. Referring to FIG. 9A, a frequency offset estimation module 21 in the embodiment includes an interpolation unit 201, a frequency offset calculator 203, a frequency compensator 205 and a frequency offset control unit 207, wherein the interpolation unit 201 and the frequency offset calculator 203 can be implemented referring to the above-described exemplary embodiments and are thus omitted to describe. The frequency compensator 205 is coupled to the interpolation unit 201 and compensates the input signal according to a frequency correction signal to produce a baseband signal. The frequency offset control unit 207 is coupled to the frequency compensator 205 and produces the frequency correction signal according to a frequency offset angle. In other words, the frequency offset of the baseband signal can be compensated by means of the frequency compensator 205 and the frequency offset control unit 207.

Figure 9B:
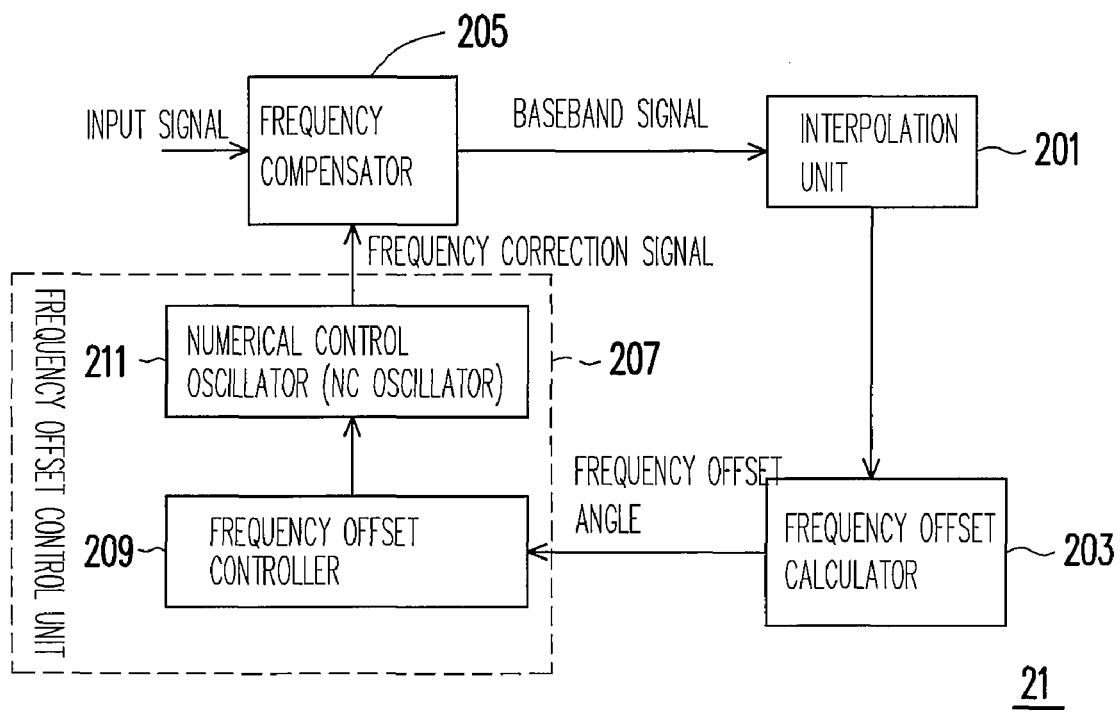
FIG. 9B is an architecture block diagram of a frequency offset estimation module according to the sixth exemplary embodiment of the present invention.

FIG. 9B is an architecture block diagram of a frequency offset estimation module according to the sixth exemplary embodiment of the present invention. Referring to FIG. 9B, in another exemplary embodiment, a frequency offset control unit 207 includes a frequency offset controller 209 and a numerical control oscillator (NC oscillator) 211. The frequency offset controller 209 is coupled to the frequency offset calculator 203 and outputs a control signal according to the frequency offset angle. The NC oscillator 211 is coupled to the frequency offset controller 209 and produces the frequency correction signal according to the control signal so as to compensate the frequency offset by means of the reconstructed preamble.

In summary, the exemplary embodiments of the present invention use linear interpolating or sinc function interpolating prior to estimating frequency offset to reconstruct the preamble of the baseband signal so as to increase the accuracy of estimating frequency offset. Thereafter, an input signal is adjusted (compensated) according to the estimated frequency offset angle so as to avoid the orthogonality of carriers from being broken. In this way, the present invention is able to save the cost required by increasing sampling frequency adopted in the prior art.

It will be apparent to those skilled in the art that various modifications and variations can be made to the structure of the present invention without departing from the scope or concept of the invention. In view of the foregoing, it is intended that the present invention covers modifications and variations of this invention provided they fall within the scope of the following claims and their equivalents.

What is claimed is:

1. A method for estimating frequency offset, suitable for a wireless communication with a quasi-periodical pilot structure, comprising:
    receiving a baseband signal with a preamble featuring quasi-periodic property;
    reconstructing the quasi-period property of the preamble of the received baseband signal by interpolation; and
    performing a frequency offset calculation on the reconstructed baseband signal to obtain a frequency offset angle, wherein the frequency offset calculation comprises:
        performing a correlation operation on a first quasi-period and a second quasi-period of the preamble of the baseband signal to obtain a first correlation function;
        performing a correlation operation on the second quasi-period and a third quasi-period of the preamble of the baseband signal to obtain a second correlation function;
        performing a correlation operation on the first correlation function and the second correlation function to obtain a third correlation function; and
        extracting the frequency offset angle according to the third correlation function.

2. The method for estimating frequency offset according to claim 1, wherein the interpolation is a linear interpolation.

3. The method for estimating frequency offset according to claim 1, wherein the interpolation is a sinc function interpolation.

4. A method for estimating frequency offset, suitable for a wireless communication with a quasi-periodical pilot structure, comprising:
    receiving a baseband signal with a preamble featuring quasi-periodic property;
    reconstructing the quasi-period property of the preamble of the received baseband signal by interpolation; and
    performing a frequency offset calculation on the reconstructed baseband signal to obtain a frequency offset angle, wherein the frequency offset calculation comprises:
        performing a conjugating processing on a first quasi-period of the preamble of the baseband signal to obtain a first conjugating quasi-period;
        performing a correlation operation on a second quasi-period and the first conjugating quasi-period to obtain a first correlation function; and
        extracting the frequency offset angle according to the first correlation function.

5. The method for estimating frequency offset according to claim 1, wherein the step of performing a correlation operation on the first quasi-period and the second quasi-period of the preamble of the baseband signal to obtain the first correlation function comprises:
    performing a conjugating processing on the first quasi-period of the preamble of the baseband signal to obtain a first conjugating quasi-period; and
    performing a correlation operation on the first conjugating quasi-period and the second quasi-period to obtain the first correlation function.

6. The method for estimating frequency offset according to claim 1, wherein the step of performing a correlation operation on the first quasi-period and the second quasi-period of the preamble of the baseband signal to obtain the first correlation function comprises:
    performing a conjugating processing on the second quasi-period of the preamble of the baseband signal to obtain a second conjugating quasi-period; and
    performing a correlation operation on the second conjugating quasi-period and the first quasi-period to obtain the first correlation function.

7. The method for estimating frequency offset according to claim 1, wherein the step of performing a correlation operation on the second quasi-period and the third quasi-period of the preamble of the baseband signal to obtain the second correlation function comprises:
    performing a conjugating processing on the second quasi-period of the preamble of the baseband signal to obtain a second conjugating quasi-period; and
    performing a correlation operation on the second conjugating quasi-period and the third quasi-period to obtain the second correlation function.

8. The method for estimating frequency offset according to claim 1, wherein the step of performing a correlation operation on the second quasi-period and the third quasi-period of the preamble of the baseband signal to obtain the second correlation function comprises:
    performing a conjugating processing on the third quasi-period of the preamble of the baseband signal to obtain a third conjugating quasi-period; and
    performing a correlation operation on the third conjugating quasi-period and the second quasi-period to obtain the second correlation function.

9. A frequency offset estimation module, suitable for a wireless communication with a quasi-periodic pilot structure, comprising:
    an interpolation unit, for receiving a baseband signal, wherein a preamble of the baseband signal comprises quasi-periodic property and the interpolation unit uses interpolation to reconstruct better quasi-periodic property of the preamble of the baseband signal; and
    a frequency offset calculator, coupled to the interpolation unit for calculating a frequency offset angle according to the reconstructed baseband signal, wherein the frequency offset calculator comprises:
        a correlation function unit, coupled to the interpolation unit for producing a first correlation function according to the baseband signal, wherein the correlation function unit comprises:
            a first conjugating unit, coupled to the interpolation unit for performing a conjugating processing on a first quasi-period of the preamble of the baseband signal to obtain a first conjugating quasi-period; and
            a first multiplier, coupled to the interpolation unit and the first conjugating unit for performing a correlation operation on a second quasi-period and the first conjugating quasi-period to obtain the first correlation function; and an angle-extracting unit, coupled to the correlation function unit for extracting the frequency offset angle according to the first correlation function.

10. The frequency offset estimation module according to claim 9, further comprising:
a frequency compensator, coupled to the interpolation unit for compensating an input signal according to a frequency correction signal to produce the baseband signal; and
a frequency offset control unit, coupled to the frequency offset calculator for producing the frequency correction signal according to the frequency offset angle.

11. The frequency offset estimation module according to claim 10, wherein the frequency offset control unit comprises:
a frequency offset controller, coupled to the frequency offset calculator for outputting a control signal according to the frequency offset angle; and
a numerical control oscillator, coupled to the frequency offset controller for producing the frequency correction signal according to the control signal.

12. The frequency offset estimation module according to claim 9, wherein the interpolation unit is a linear interpolation unit.

13. The frequency offset estimation module according to claim 9, wherein the interpolation unit is a sinc function interpolation unit.

14. The frequency offset estimation module according to claim 9, wherein the preamble has three quasi-periods.

15. A frequency offset estimation module, suitable for a wireless communication with a quasi-periodic pilot structure, comprising:
an interpolation unit, for receiving a baseband signal, wherein a preamble of the baseband signal comprises quasi-periodic property and the interpolation unit uses interpolation to reconstruct better quasi-periodic property of the preamble of the baseband signal;
a frequency offset calculator, coupled to the interpolation unit for calculating a frequency offset angle according to the reconstructed baseband signal, wherein the frequency offset calculator comprises:
a correlation function unit, coupled to the interpolation unit for producing a first correlation function according to the baseband signal, wherein the correlation function unit comprises:
a first conjugating unit, coupled to the interpolation unit for performing a conjugating processing on a first quasi-period of the preamble of the baseband signal to obtain a first conjugating quasi-period;
a first multiplier, coupled to the interpolation unit and the first conjugating unit for performing a correlation operation on a second quasi-period of the preamble of the baseband signal and the first conjugating quasi-period to obtain a second correlation function;
a second multiplier, coupled to the interpolation unit and the first conjugating unit for performing a correlation operation on a third quasi-period of the preamble of the baseband signal and the first conjugating quasi-period to obtain a third correlation function; and
a third multiplier, coupled to the first interpolation unit and the second multiplier for performing a correlation operation on the second correlation function and the third correlation function to obtain the first correlation function; and an angle-extracting unit, coupled to the correlation function unit for extracting the frequency offset angle according to the first correlation function.

16. A frequency offset estimation module, suitable for a wireless communication with a quasi-periodic pilot structure, comprising:
an interpolation unit, for receiving a baseband signal, wherein a preamble of the baseband signal comprises quasi-periodic property and the interpolation unit uses interpolation to reconstruct better quasi-periodic property of the preamble of the baseband signal;
a frequency offset calculator, coupled to the interpolation unit for calculating a frequency offset angle according to the reconstructed baseband signal, wherein the frequency offset calculator comprises:
a correlation function unit, coupled to the interpolation unit for producing a first correlation function according to the baseband signal, wherein the correlation function unit comprises:
a first conjugating unit, coupled to the interpolation unit for performing a conjugating processing on a first quasi-period of the preamble of the baseband signal to obtain a first conjugating quasi-period;
a first multiplier, coupled to the interpolation unit and the first conjugating unit for performing a correlation operation on a second quasi-period of the preamble of the baseband signal and the first conjugating quasi-period to obtain a second correlation function;
a second conjugating unit, coupled to the interpolation unit for performing a conjugating processing on the second quasi-period of the preamble of the baseband signal to obtain a second conjugating quasi-period;
a second multiplier, coupled to the interpolation unit and the second conjugating unit for performing a correlation operation on a third quasi-period of the preamble of the baseband signal and the second conjugating quasi-period to obtain a third correlation function; and
a third multiplier, coupled to the first multiplier and the second multiplier for performing a correlation operation on the second correlation function and the third correlation function to obtain the first correlation function; and
an angle-extracting unit, coupled to the correlation function unit for extracting the frequency offset angle according to the first correlation function.

17. A frequency offset estimation module, suitable for a wireless communication with a quasi-periodic pilot structure, comprising:
an interpolation unit, for receiving a baseband signal, wherein a preamble of the baseband signal comprises quasi-periodic property and the interpolation unit uses interpolation to reconstruct better quasi-periodic property of the preamble of the baseband signal;
a frequency offset calculator, coupled to the interpolation unit for calculating a frequency offset angle according to the reconstructed baseband signal, wherein the frequency offset calculator comprises:
a correlation function unit, coupled to the interpolation unit for producing a first correlation function according to the baseband signal, wherein the correlation function unit comprises:
a first conjugating unit, coupled to the interpolation unit for performing a conjugating processing on a first quasi-period of the preamble of the baseband signal to obtain a first conjugating quasi-period;

a first multiplier, coupled to the interpolation unit and the first conjugating unit for performing a correlation operation on a second quasi-period of the preamble of the baseband signal and the first conjugating quasi-period to obtain a second correlation function;

a second conjugating unit, coupled to the interpolation unit for performing a conjugating processing on a third quasi-period of the preamble of the baseband signal to obtain a third conjugating quasi-period;

a second multiplier, coupled to the interpolation unit and the second conjugating unit for performing a correlation operation on the second quasi-period of the preamble of the baseband signal and the third conjugating quasi-period to obtain a third correlation function; and a third multiplier, coupled to the first multiplier and the second multiplier for performing a correlation operation on the second correlation function and the third correlation function to obtain the first correlation function; and an angle-extracting unit, coupled to the correlation function unit for extracting the frequency offset angle according to the first correlation function.

* * * * *